US008402505B2

(12) United States Patent
Alten

(10) Patent No.: US 8,402,505 B2
(45) Date of Patent: Mar. 19, 2013

(54) DISPLAYING ENHANCED CONTENT INFORMATION ON A REMOTE CONTROL UNIT

(75) Inventor: Steven D. Alten, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1899 days.

(21) Appl. No.: 10/969,156

(22) Filed: Oct. 20, 2004

(65) Prior Publication Data

US 2005/0055640 A1   Mar. 10, 2005

Related U.S. Application Data

(63) Continuation of application No. 09/498,421, filed on Feb. 4, 2000, now abandoned.

(51) Int. Cl.
*H04N 7/16* (2011.01)
(52) U.S. Cl. ....................................................... 725/141
(58) Field of Classification Search .................. 725/141; 348/734
See application file for complete search history.

(56) References Cited

U.S. PATENT DOCUMENTS

| | | | | |
|---|---|---|---|---|
| 5,710,605 A | * | 1/1998 | Nelson | 348/734 |
| 5,831,664 A | * | 11/1998 | Wharton et al. | 725/81 |
| 6,018,768 A | * | 1/2000 | Ullman et al. | 709/218 |
| 6,097,441 A | * | 8/2000 | Allport | 348/552 |
| 6,130,726 A | * | 10/2000 | Darbee et al. | 348/734 |
| 6,169,568 B1 | * | 1/2001 | Shigetomi | 725/76 |
| 6,278,499 B1 | * | 8/2001 | Darbee et al. | 348/734 |
| 6,460,180 B1 | * | 10/2002 | Park et al. | 725/40 |
| 6,477,508 B1 | * | 11/2002 | Lazar et al. | 705/26 |
| 6,496,122 B2 | * | 12/2002 | Sampsell | 340/825.69 |
| 6,496,981 B1 | * | 12/2002 | Wistendahl et al. | 725/112 |
| 6,757,001 B2 | * | 6/2004 | Allport | 715/840 |
| 2002/0085128 A1 | * | 7/2002 | Stefanik | 348/734 |
| 2002/0184625 A1 | * | 12/2002 | Allport | 725/39 |
| 2003/0145338 A1 | * | 7/2003 | Harrington | 725/136 |

FOREIGN PATENT DOCUMENTS

| | | |
|---|---|---|
| JP | 11-243512 | 9/1999 |
| JP | 2000-83178 | 3/2000 |

* cited by examiner

*Primary Examiner* — Brian Pendleton
*Assistant Examiner* — Ryan Stronczer
(74) *Attorney, Agent, or Firm* — Trop, Pruner & Hu, P.C.

(57) ABSTRACT

A remote control unit for a video receiver may be utilized to display information about enhanced content available in conjunction with a video broadcast. The information displayed on the remote control unit display may provide information about available enhanced content, advertising, or even the status of connected devices, such as telephones, computer systems, digital video disk players, and video cassette recorders. By transmitting the data from the video receiver to the remote control unit, the information is available to the user without interrupting the display on the user's video receiver.

6 Claims, 4 Drawing Sheets

DISPLAYING ENHANCED CONTENT INFORMATION ON A REMOTE CONTROL UNIT

This is a continuation of prior application Ser. No. 09/498,421, filed Feb. 4, 2000 now abandoned.

BACKGROUND

The present invention relates to video receiving systems and particularly to remote control units for video receiving systems.

Conventional television receivers may be controlled by a remote control unit. The remote control unit may communicate with the television receiver by a wired or wireless connection. For example, radio frequency or infrared wireless connections may be utilized.

The user may also wish to remotely control a computer system that operates in conjunction with a conventional television receiver. Computer systems, sometimes called set-top computer systems, may be of relatively small size, in some embodiments, and may be positioned on top of a television receiver. The remote control unit may control the set-top computer system which in turn controls the associated television receiver.

Ancillary information, such as program subtitles, emergency messages, closed caption messages and program guide information may be transmitted along with regular television content. More recently, other types of ancillary information that may be sent with the television content includes enhancement data such as web pages, multi-media information or other digital data files. Ancillary information may be sent in the vertical blanking interval (VBI) of an analog television broadcast signal or may sent with digital television content over a digital transmission transport medium.

Various standards exist to provide for transmission of ancillary information along with television content. One standard is the Advanced Television Enhancement Forum (ATVEF) Specification, Draft 1.1r26 dated Feb. 2, 1999. The ATVEF Specification provides for transmission of enhancement data along with television content in both analog and digital systems, such as cable systems, satellite systems, terrestrial systems and so forth.

When enhancement data is available for viewing in conjunction with the broadcast television signal, the viewer usually is advised of its availability. This is conventionally done by an overlay icon which is provided on the viewing screen of the television receiver. However, some viewers prefer to view the broadcast content without additional overlay information. Thus, these viewers may disable the overlay announcements about enhancement data that accompany the television broadcast. As a result, these users are disabled from taking advantage of this enhanced data.

Thus, there is a need for a way to advise users of the availability of enhancement data without interfering with the presentation of the displayed video.

SUMMARY

In accordance with one aspect, a method includes providing enhanced content with video information to a video receiver. Information about the enhanced content is displayed on a display for a remote control unit for the video receiver.

Other aspects are set forth in the accompanying detailed description and claims.

DETAILED DESCRIPTION

Figure 1:
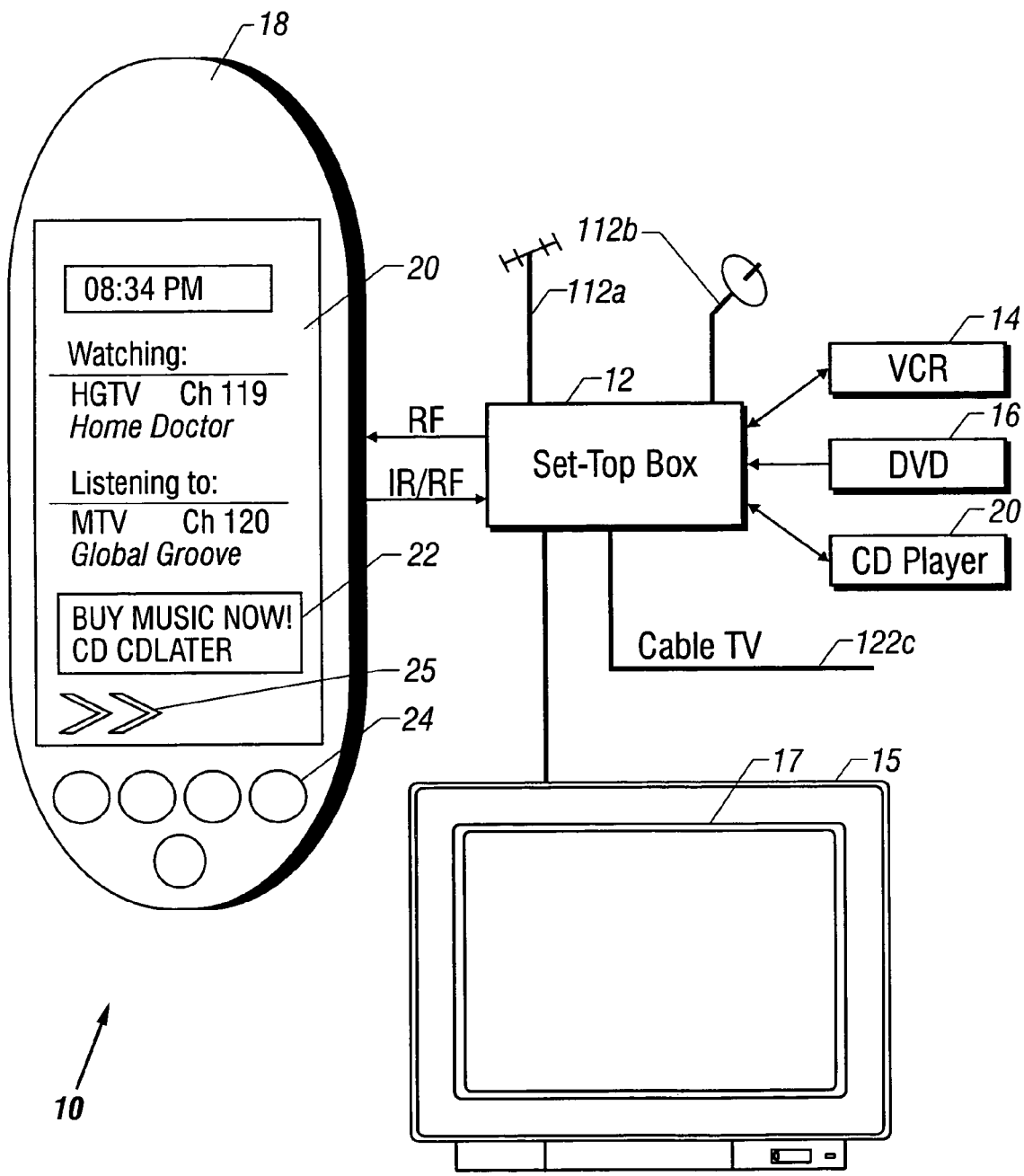
FIG. 1 is a schematic depiction of one embodiment of the present invention.

A video receiver system 10, shown in FIG. 1, may include a processor-based system 12 such as a set-top computer system coupled to a video receiver 15, such as a television receiver, having a display 17. The system 12 may be coupled to one or more sources of video information including a cable television source 112c, a satellite television antenna 112b or a terrestrial television antenna 112a.

Also coupled to the system 12 is a remote control unit 18. The remote control unit 18 may be coupled to the system 12 using a wired or wireless connection. In one embodiment of the present invention, a bi-directional wireless connection may be implemented using either infrared or radio frequency signals. In one embodiment of the present invention, the system 12 may send radio frequency signals to the remote control unit 18 and may receive signals from the remote control unit 18 through either infrared or radio frequency communication protocols.

The remote control unit 18 may include a display 20 which in one embodiment of the present invention may be implemented by a liquid crystal display. The display 20 may provide information about available video as indicated at 23 or about the video actually being viewed as two examples. In addition, enhancement data may be displayed on the display 20 as indicated at 22. In the illustrated case, the data 22 is an advertisement.

The advertisement may provide information to enable the user to immediately purchase an offered item. The user may operate the remote control unit 18 to provide a signal to the system 12 that communicates with a service provider indicating the user's selection. For example, in one embodiment of the present invention, the display 20 may be a touch screen display. When the user touches the screen proximate to the displayed data 22, the corresponding product may be purchased. Alternatively, a display screen may be displayed which allows the user to enter more information about the user and the requested item. In addition, the remote control unit 18 may include a plurality of control buttons 24 to allow the user to implement selections for controlling the display of video information on the screens 20 and 17.

The incoming video information may include television content and enhancement data. The enhancement data may include graphics such as web pages, multimedia information or other digital files, presentation layouts, and synchronization information.

The reception of ancillary information may be signified to the user by displaying an icon indicating that enhanced information accompanies the programming currently displayed. This alerts the user to the possibility that additional information is available. In some cases, the icon may constitute a link which may be clicked on or selected to automatically bring the enhanced content into focus on the display.

Enhancement data, according to the ATVEF Specification, may include announcements each having the following components: an ATVEF announcement, a resource, and a trigger. The three components may be transmitted using Internet Protocol (IP) multicast to the receivers. An IP multicast standard is described in request for comment (RFC) 1301, entitled "Multicast Transport Protocol". (RFCs are available at www.ietf.org/rfc.html.)

Generally, an ATVEF announcement indicates that enhancement data is being transmitted. The resource includes one or more files that contain the enhancement data, and the trigger synchronizes the enhancement data with the television transmission. An announcement may describe the location of both the resource stream and the trigger stream. For each video channel, one or more enhancements may be offered as choices presented to the user, who can select which of the enhancements, if any, to view. The ATVEF Specification may utilize a one-way transmission protocol (the unidirectional hypertext transfer protocol or UHTTP, described in the ATVEF Specification) to deliver resource data.

The announcements, resources and triggers associated with an video channel may be delivered at about the same time as, and with the transmission of, the video content on that channel. Conventionally, for each enhancement, the resource stream may be delivered along with the announcement, with the resource stream stored locally in the receiver. If the viewer so desires, the enhancement data can be retrieved from local storage.

To provide for greater flexibility and/or to alleviate bandwidth concerns of the transport medium, some embodiments of the present invention transmit enhancement data associated with television channels over a link that is separate from the transport medium used to transmit the television or video content. Alternatively, the link may be part of the same delivery mechanism as the television content but not associated with any particular channel.

In accordance with one embodiment of the present invention, the user may be given information about the ancillary information that may have been transported with the television content. For example, in accordance with one embodiment of the present invention, a chevron-shaped indicator 25 may be displayed on the display 20 to indicate the transmission of ancillary information in general. An additional indicator may be provided to give information about the particular type of content provided as ancillary information, in one embodiment of the present invention.

The indicator 25 may provide information about the ancillary information, such as enhancement data, that has been provided with the television content. This gives the user greater information about the ancillary information enabling the user to make an informed decision about whether or not to access the ancillary information. In some cases, the indicator 25 may be a hyperlink that allows the user to select the indicator 25 to jump immediately to the ancillary information.

Figure 2:
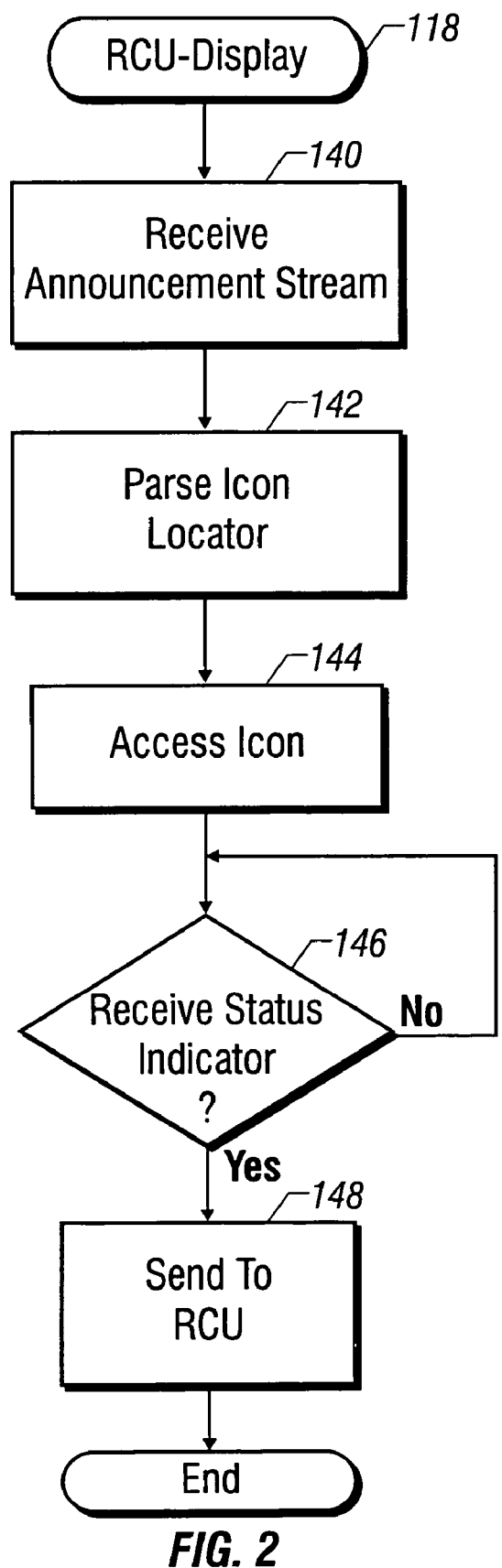
FIG. 2 is a flow diagram for a software in accordance with one embodiment of the present invention.

Software 118 resident on the system 12 begins by receiving an announcement stream as indicated in block 140 in FIG. 2. The announcement stream is parsed to locate an icon locater, as indicated in block 142.

The icon locator may take a variety of forms. In one embodiment of the present invention, the icon locator may be a uniform resource locator (URL). The URL may point to an Internet web address containing information about a suitable icon that may be displayed to provide the user with information about the content contained within the ancillary information. Alternatively, the URL may point to a location in the transmitted ancillary information that may be utilized to access and then display a suitable icon. Alternatively, a local identifier (LID) may be provided. Particularly, where the information is not necessarily available on an "on demand" basis, a local identifier may be utilized to provide a name for a resource such as a content-identifier icon. The use of a local identifier supports cross-references within the content to the resource. The local identifier may be useful in creating hyperlinks or embedding one piece of content within another. The local identifier enables content creators to assign unique identifiers to each resource relative to a given name space.

Thus, the local identifier may be utilized to access the indicator 25 information repeatedly. Once the indicator 25 has been stored on the system 12 and is identified through the local identifier, it can be called up repeatedly and used over and over again. For example, in one embodiment of the present invention, the system 12 may be loaded with a plurality of content identifying icon images before those images are actually needed. The icon code for one of those icons may be sent with an announcement stream that identifies the icon already on the receiver. The local identifier or URL may be transmitted as part of the triggers. Triggers are real time events delivered for enhanced televisions programs. The receiver may set its own policy for allowing users to enable or disable enhanced television content and triggers may be utilized as a signal to notify users of an enhanced content availability. Triggers generally include a URL and may optionally also include a human readable name, an expiration date and script. The expiration date in connection with triggers utilized to announce the arrival of a particular type of content may provide for a limited duration of the display of the icon.

In accordance with one embodiment of the present invention, the announcement stream may include script that causes a transparent overlay to be produced over the displayed image on the display 22 of the remote control unit 18. The transparent overlay may include one or more icons or identifiers 25 to identify the content that accompanies the enhanced television content.

After the icon locator has been parsed, the icon information may be accessed either from the local system or from the Internet as two examples, as indicated at block 144, in FIG. 2. One or more icons are then displayed on the remote control unit.

In this way, after the video information has been received and the enhancement data has been parsed from the video content, the icon locator may be further parsed and transmitted to the remote control unit 18. Upon receipt by the remote control unit 18, the icon may be displayed. The icon may, in one embodiment of the present invention, be an icon which allows the user to select for viewing enhanced content. In another embodiment of the present invention, the icon may provide advertising information.

Once the icon has been received as indicated in diamond 146 in FIG. 2, it may then be transmitted to the remote control unit 18 for display on the screen 22, as indicated in block 148. In some embodiments of the present invention, the user can select those items which may be parsed from the stream, identified, and transmitted for display on the screen 22. For example, announcements that include advertising information may include a code that allows them to be parsed and sent or not sent to the display 22. The information about general ancillary information available with the television program may similarly be coded for separate parsing and selective transmission to the remote control unit 18.

In addition, information about the status of peripherals may be displayed on the remote control unit 18. For example, the status of video playing devices such as digital video disk players 14, video cassette recorders 14 and compact disk players 20 may be displayed on the remote control unit display 22. Thus, status information about the current status of those device is available through the remote control unit 18 without disturbing the display of the ongoing video content on the display 17.

In addition, the remote control unit 18 may provide information about incoming e-mail or incoming telephone calls including caller identification information.

Figure 3:
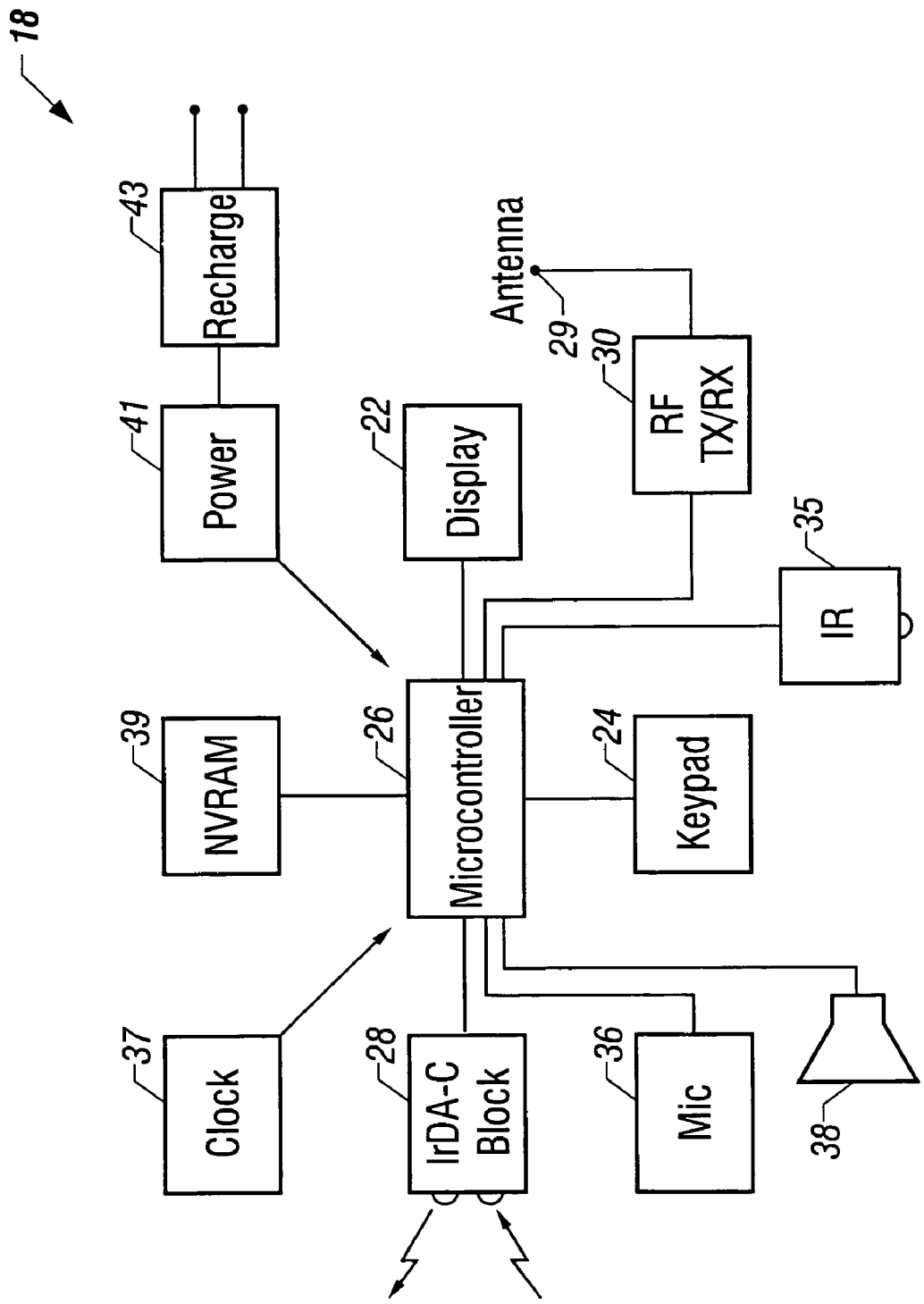
FIG. 3 is a block depiction of a remote control unit in accordance with one embodiment of the present invention.

Referring to FIG. 3, the RCU 18 may include a display 22 which in one embodiment of the invention may be a liquid crystal display. A controller 26 may be coupled to a memory 39 and may be responsible for controlling the display 22 as well as an RF transceiver 30. The controller 26 may be processor-based and may be a microcontroller or a microprocessor, as examples. The RF transceiver 30 may send radio frequency voice information to the system 12. The transceiver 30, in one embodiment of the invention, uses an internal antenna 29 that may be built into the RCU 18. An IR transceiver 28 may be used to communicate with the system 12 using a bidirectional infrared protocol such as the IrDA-C protocol in one embodiment of the invention. The IR transmitter 35 may be used to communicate with legacy devices using a unidirectional protocol in one embodiment of the invention.

The controller 26 may also control the keypad 24 for allowing user input commands. A microphone 36 and speaker 38 enable additional functions. A clock 37 and battery power supply 41 with a recharger 43 may also be provided.

Figure 4:
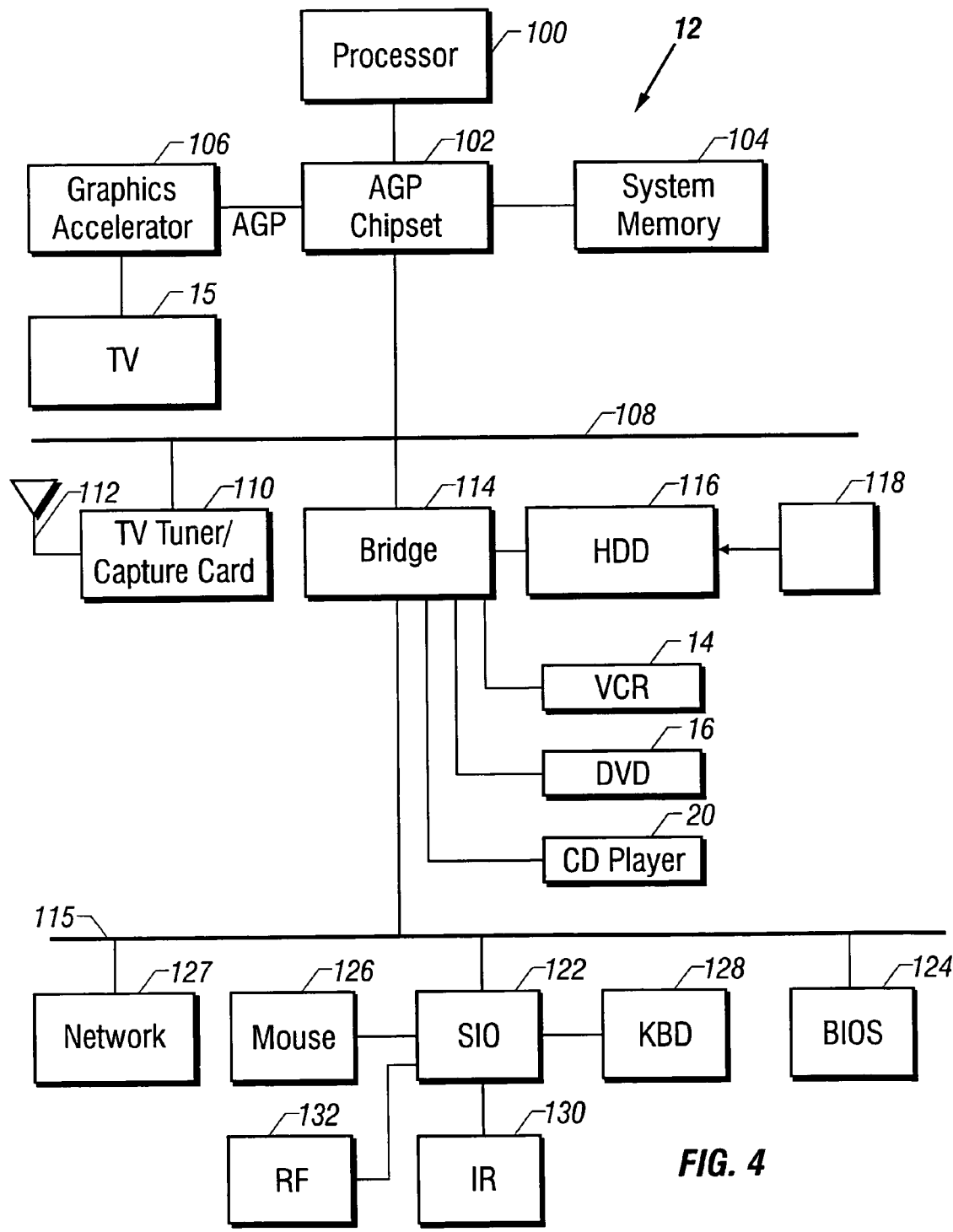
FIG. 4 is a block diagram of a processor-based system in accordance with one embodiment of the present invention.

Referring now to FIG. 4, an example of a system for providing the capabilities described previously may involve either a computer, a television receiver, a set-top computer system or another appliance. The illustrated system 12 includes a processor 100 coupled to an accelerated graphics port (AGP) chipset 102. AGP is described in detail in the Accelerated Graphics Port Interface Specification, revision 2.0, published in 1998 by Intel Corporation of Santa Clara, Calif.

The AGP chipset 102 may in turn be coupled to system memory 104 and a graphics accelerator 106. The graphics accelerator 106 may be coupled to a TV receiver 15.

The chipset 102 may also coupled a bus 108 which in turn may be coupled to a TV tuner/capture card 110. The tuner/capture card 110 may be coupled to a television input 112. The input 112 may, for example be a conventional TV antenna, a satellite antenna, a cable connection, or other television inputs. The card 110 may receive television signals in one video format and may convert them into a format used by the system 12.

The bus 108 may also be coupled to another bridge 114 which in turn couples a hard disk drive 116. The hard disk drive 116 may store the software 118.

The bridge 114 may be coupled to a bus 115 in turn coupled to a Serial Input/Output (SIO) device 122 and a Basic Input/Output System (BIOS) 124. The SIO device 122 may interface to a mouse 126 and a keyboard 128, and IR interface 130 and RF interface 132 that couple the system 12 to the RCU 18.

The infrared interface 130 may, for example, be in accordance with the Infrared Data Association protocols such as, for example, the Serial Infrared Physical Layer Link Specification, version 1.2, dated Nov. 30, 1997. The RF interface 132 may be coupled to an antenna for RF communications with the RCU 18. The bus 115 may also coupled a network interface which may include a voice modem that may be coupled to a telephone line.

The graphical user interfaces described herein are visual representations of memory states. The graphical user interfaces displayed on the display 22 may be stored in a memory such as one or more of the memories 104 or 116.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving video information, an icon locator, and an enhancement including content selectively displayable on a first display, said video information being displayable on a second display, said enhancement being information about an incoming email or an incoming telephone call and further including code, said code designating the first display;
   recognizing said code;
   based on said code, parsing said icon locator to access an icon image of a plurality of icon images, wherein said plurality of icon images are included in local storage; and
   displaying said icon image on the first display, said icon image to identify a type of content of said enhancement.

2. The method of claim 1 further comprising receiving a user selection of said icon image on the first display.

3. The method of claim 2 further comprising, in response to receiving said user selection, displaying the enhancement on said first display, wherein said first display is a remote control display.

4. The method of claim 3, wherein displaying the enhancement comprises displaying caller identification information on said remote control display.

5. The method of claim 1 including parsing said enhancement from the video information and parsing the code from said enhancement.

6. The method of claim 1, further comprising receiving a second enhancement, said second enhancement being information about a status of a peripheral video device.

* * * * *